United States Patent
Kawanishi et al.

(10) Patent No.: US 10,038,398 B2
(45) Date of Patent: Jul. 31, 2018

(54) MOTOR CONTROL, APPARATUS, MOTOR CONTROL METHOD, CONTROL SYSTEM, INFORMATION PROCESSING PROGRAM AND RECORDING MEDIUM

(71) Applicant: OMRON Corporation, Kyoto (JP)

(72) Inventors: Yasutomo Kawanishi, Kusatsu (JP); Mamoru Egi, Otsu (JP); Yasushi Ohno, Kusatsu (JP); Yasumoto Mori, Joyo (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 15/410,776

(22) Filed: Jan. 20, 2017

(65) Prior Publication Data

US 2017/0264231 A1 Sep. 14, 2017

(30) Foreign Application Priority Data

Mar. 14, 2016 (JP) ................................. 2016-049396

(51) Int. Cl.
| | |
|---|---|
| H02P 6/16 | (2016.01) |
| H02P 29/02 | (2016.01) |
| G05B 13/02 | (2006.01) |
| G05B 15/02 | (2006.01) |
| H02P 23/14 | (2006.01) |

(52) U.S. Cl.
CPC .............. *H02P 29/02* (2013.01); *G05B 13/02* (2013.01); *G05B 15/02* (2013.01); *H02P 23/14* (2013.01); *H02P 2203/11* (2013.01)

(58) Field of Classification Search
CPC ... F16N 13/02; F16N 7/14; F16N 7/38; F16N 2270/70; F16N 29/02
See application file for complete search history.

(56) References Cited

U.S. PATENT DOCUMENTS 4,591,769 A * 5/1986 Beckerman .............. H02P 7/295
                                                        318/257
6,822,415 B1  11/2004 Komiya et al.
(Continued)

FOREIGN PATENT DOCUMENTS

| EP | 1283593 | 2/2003 |
| EP | 2197103 | 6/2010 |

(Continued)

OTHER PUBLICATIONS

"Search Report of European Counterpart Application," dated Feb. 21, 2018, p. 1-p. 9, in which the listed references were cited.

*Primary Examiner* — Shawki S Ismail
*Assistant Examiner* — Zoheb Imtiaz
(74) *Attorney, Agent, or Firm* — JCIPRNET

(57) ABSTRACT

The present invention realizes a motor control apparatus and the like capable of obtaining an appropriate frequency characteristic. The motor control apparatus of the present invention includes a command value generating portion (10), a torque saturation detecting portion (61) for determining whether a driving value based on a command value exceeds a driving value capable of being output from the apparatus, a current saturation detecting portion (71), a voltage saturation detecting portion (72), and a command value correcting portion (20) for correcting the command value when the driving value is determined as being exceeded.

11 Claims, 11 Drawing Sheets

(56) References Cited

U.S. PATENT DOCUMENTS

| | | | | |
|---|---|---|---|---|
| 2004/0085035 A1* | 5/2004 | Tazawa | ................... | H02P 6/06 |
| | | | | 318/432 |
| 2006/0022628 A1* | 2/2006 | Okumatsu | ................ | H02P 6/16 |
| | | | | 318/437 |
| 2006/0279241 A1* | 12/2006 | Tsutsui | .................. | H02P 23/18 |
| | | | | 318/434 |
| 2010/0148707 A1* | 6/2010 | Tobari | .................... | H02P 6/085 |
| | | | | 318/400.02 |
| 2012/0133311 A1* | 5/2012 | Kawai | ................... | H02P 6/181 |
| | | | | 318/400.12 |
| 2014/0026831 A1* | 1/2014 | Mahrs | ..................... | F01P 7/04 |
| | | | | 123/41.05 |
| 2015/0309500 A1* | 10/2015 | Hashimoto | ............ | G05B 19/19 |
| | | | | 318/630 |
| 2015/0355607 A1* | 12/2015 | Nagaoka | ............... | G05B 19/19 |
| | | | | 318/561 |
| 2016/0124417 A1* | 5/2016 | Ogawa | ................ | G05B 19/404 |
| | | | | 318/619 |
| 2017/0010602 A1* | 1/2017 | Iijima | ................... | G05B 19/19 |

FOREIGN PATENT DOCUMENTS

| | | |
|---|---|---|
| EP | 2985907 | 2/2016 |
| JP | 3818371 | 9/2006 |

* cited by examiner

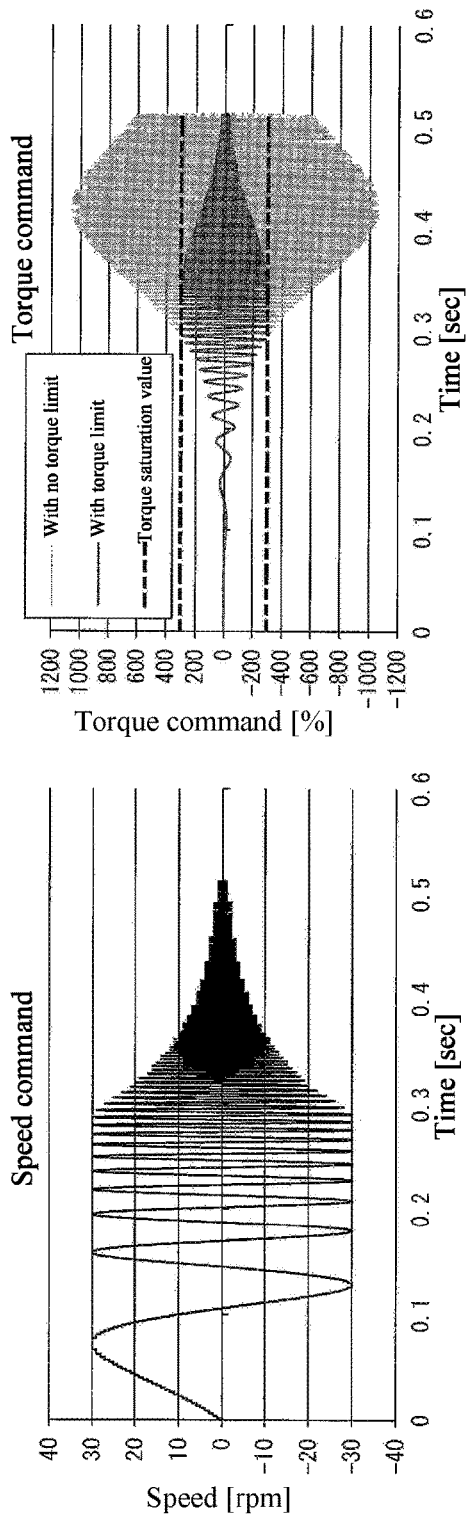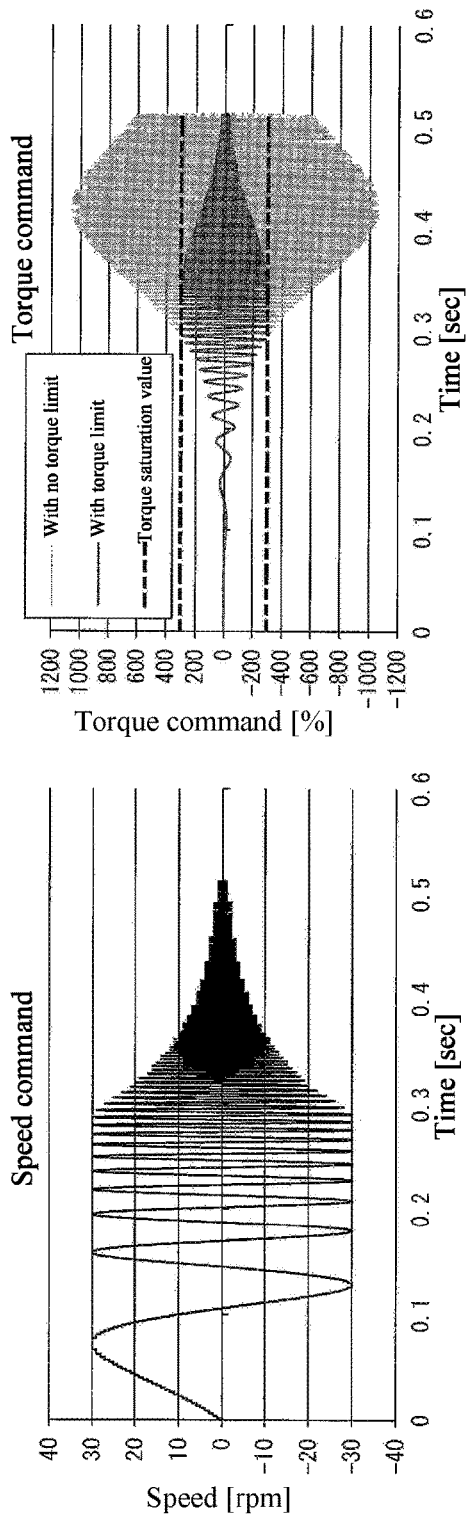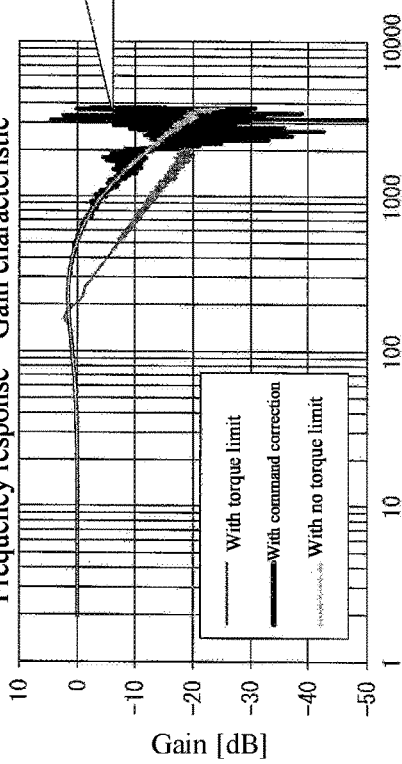

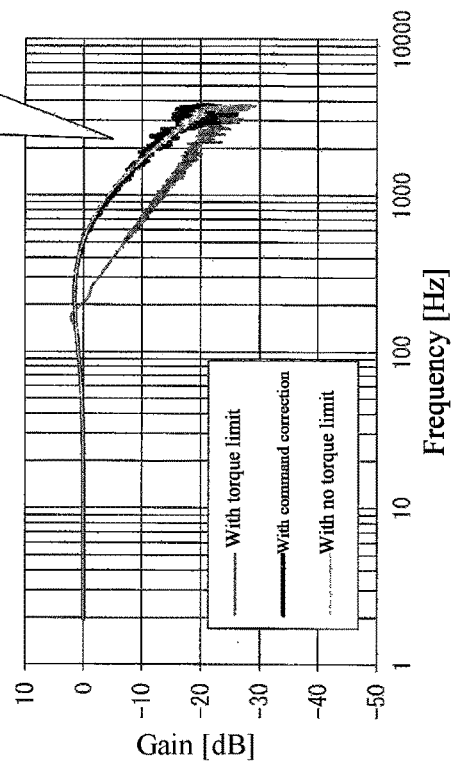
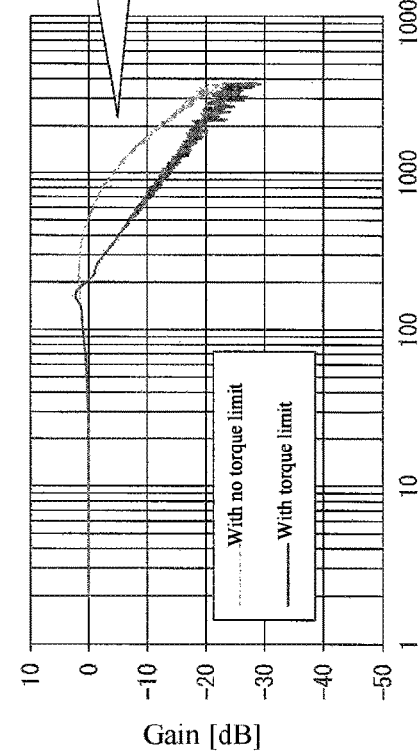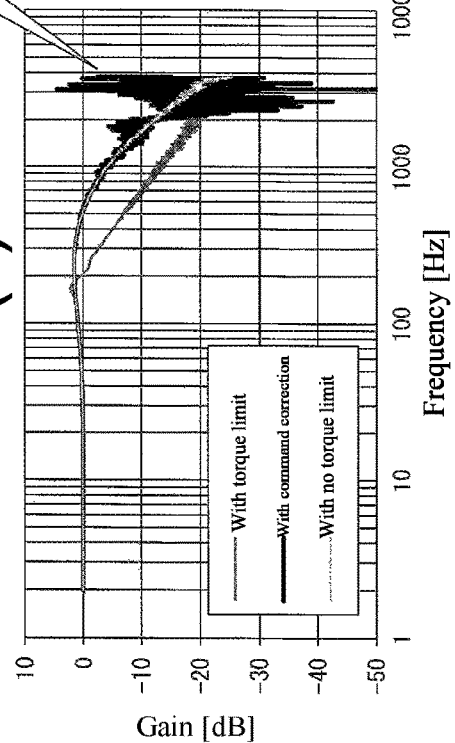

MOTOR CONTROL, APPARATUS, MOTOR CONTROL METHOD, CONTROL SYSTEM, INFORMATION PROCESSING PROGRAM AND RECORDING MEDIUM

CROSS-REFERENCE TO RELATED APPLICATION

This application claims the priority benefit of Japan application no. 2016-049396, filed on Mar. 14, 2016. The entirety of each of the above-mentioned patent applications is hereby incorporated by reference herein and made a part of this specification.

BACKGROUND OF THE INVENTION

1. Field of the Invention

The present invention generally relates to a motor control apparatus and the like for controlling machine tools.

2. Description of Related Art

In order to set control parameters of a motor for controlling an object machine such as a machine tool or to set a set value of a filter, a technology of measuring frequency characteristics of the object machine are known. For example, a technique is recorded in patent document 1 as follows: a command value (command pattern) including a plurality of frequency components is generated, the command value is used to drive the motor and the object machine, actions of the object machine are measured, and the command value and a measured value are used to analyze frequencies.

DOCUMENT OF THE PRIOR ART

Patent Document

[Patent Document 1]: Japanese Laid-Open Patent Publication No. 3818371 (registered on Jun. 23, 2006)

SUMMARY OF THE INVENTION

Problems to be Solved by the Invention

In order to improve the accuracy of the frequency characteristic obtained by frequency analysis based on a command value and a measured value, the command value must contain a plurality of frequency components, and the amplitude of the command value must be large.

However, in the case of the command value having a high frequency and a large amplitude, the motor and the object machine cannot follow the command value sometimes. That is, it will lead to the following phenomenon: a torque value and a current value calculated in accordance with the command value to drive the motor exceed the value capable of being output by the motor control apparatus, resulting in driving the motor via the torque value and the current value which do not correspond to the command value. In other words, an output saturation state of a command giving the capability greater than or equal to the outputting power to the motor control apparatus is generated.

Then a driving signal output from the motor control apparatus to the motor is not a value corresponding to the command value. As a result, the appropriate frequency characteristic cannot be obtained even if the frequency analysis is performed according to the command value and the measured values of the motor and the object machine driven on the basis of the command value.

The present invention is implemented in view of the above-mentioned problems, and is directed to realize a motor control apparatus and the like capable of obtaining an appropriate frequency characteristic.

Technical Means for Solving the Problems

In order to solve the above-mentioned problems, the motor control apparatus of the present invention is a motor control apparatus for controlling a motor, and characterized by including a command generating portion, for generating a command value for driving the motor; an output value determining portion, for determining whether a driving value for driving the motor generated based on the command value exceeds the driving value capable of being output from the apparatus or not; a command value correcting portion, for correcting the command value when the output value determining portion determines as exceeding the driving value capable of being output; a measured value acquiring portion, for acquiring a measured value, the measured value representing a driving state of the motor driven according to the command value or the corrected command value; and an outputting portion, for outputting the corrected command value and the measured value based on the corrected command value to an analysis apparatus for performing a frequency analysis based on a relationship of the command value and the measured value.

According to the structure, when the driving value generated based on the command value exceeds the driving value capable of being output, the command value is corrected. Therefore, the motor may not be driven directly by using an inappropriate driving value. Thus, the non-correspondence of the command value and the measured value can be prevented. Therefore, when the frequency analysis is performed based on the command value and the measured value, the frequency analysis can be appropriately executed.

In the motor control apparatus of the present invention, further, the output value determining portion performs the determination based on whether a torque value based on the command value, a current value based on the torque value or a voltage value based on the current value exceeds a threshold value.

According to the structure, whether the driving value based on the command value is the value capable of being output from the apparatus can be determined by utilizing the torque value, the current value or the voltage value.

In the motor control apparatus of the present invention, further, the command value correcting portion corrects the command value by lowering an amplitude of the command value.

According to the structure, the amplitude of the corrected command value is smaller than the amplitude of the command value before the correction. Therefore, the possibility that the driving value based on the corrected command value becomes a driving value that cannot be output can be reduced. Moreover, a method for lowering the amplitude of the command value includes, for example, multiplying the command value by a coefficient α (0<α<1).

In the motor control apparatus of the present invention, further, the command value correcting portion corrects the command value in a way of gradually decreasing the amplitude of the command value along a time series.

According to the structure, the correction can be performed in a way of gradually decreasing the amplitude of the command value before the correction along a time series.

In the motor control apparatus of the present invention, further, the command value correcting portion does not perform the correction when the amplitude of the corrected command value is equal to or less than a specified value.

According to the structure, the amplitude of the command value can be prevented from being equal to or lower than the specified value, so that an inappropriate signal/noise (S/N) ratio caused by the excessive decrease of the amplitude of the command value can be prevented.

In the motor control apparatus of the present invention, the command value may also be a location command for indicating a location of the motor, or a speed command for indicating a speed of the motor.

According to the structure, the location or the speed of the motor can be indicated.

In the motor control apparatus of the present invention, further, when the output value determining portion determines as exceeding the driving value capable of being output, the command value correcting portion adopts an output of a low pass filter as the corrected command value when the command value is inputted to the low pass filter adopting the frequency of the command value at the moment as a cut-off frequency.

According to the structure, the correction of the command value can be appropriately performed.

In the motor control apparatus of the present invention, further, the command value correcting portion continuously corrects the command value generated by the command value generating portion when the output value determining portion determines as exceeding the driving value capable of being output.

According to the structure, if the driving value is determined as exceeding the value capable of being output at one time, the command value is subsequently continuously corrected. Therefore, the driving value can be prevented from re-exceeding the value capable of being output.

In order to solve the above-mentioned problems, a control system of the present invention is a control system for outputting a frequency characteristic of a controlled object including a motor, and characterized by including a command generating portion, for generating a command value for driving the motor; an output value determining portion, for determining whether a driving value generated based on the command value and used for driving the motor exceeds the driving value capable of being output from the apparatus or not; a command value correcting portion, for correcting the command value when the output value determining portion determines as exceeding the driving value capable of being output; a measured value acquiring portion, for acquiring a measured value, the measured value representing a driving state of the motor driven according to the command value or the corrected command value; and a frequency characteristic calculation portion, for operating and outputting a frequency characteristic according to the corrected command value and the measured value based on the corrected command value when the output value determining portion determining as exceeding the driving value capable of being output.

According to the structure, when the driving value generated based on the command value exceeds the driving value capable of being output, the command value is corrected. Therefore, the motor may not be driven directly by using an inappropriate driving value. Thus, the non-correspondence of the command value and the measured value can be prevented. Therefore the frequency analysis can be appropriately executed based on the command value and the measured value.

In order to solve the above-mentioned problems, a method for controlling a motor of the present invention is characterized by including: a command value generating step, for generating a command value for driving the motor; an output value determining step, for determining whether a driving value generated based on the command value and used for driving the motor exceeds the driving value capable of being output from the apparatus or not; a command value correcting step, for correcting the command value when determining as exceeding the driving value capable of being output in the output value determining step; a measured value acquiring step, for acquiring a measured value, the measured value representing a driving state of the motor driven according to the command value or the corrected command value; and an outputting step, for outputting the corrected command value and the measured value based on the corrected command value to an analysis apparatus for performing the frequency analysis according to a relationship of the command value and the measured value when determining as exceeding the driving value capable of being output in the output value determining step.

According to the method, an effect same with the foregoing effect can be achieved.

The motor control apparatus in various forms according to the prevent invention can also be realized through a computer. At the moment, the computer is functioned as various portions (software elements) of the motor control apparatus. Moreover, the computer for implementing the motor control apparatus, an information processing program of the motor control apparatus and a computer-readable recording medium recording the program also fall within the scope of the present invention.

Effects of the Invention

According to the present invention, when the driving value generated based on the command value exceeds the driving value capable of being output, the command value is corrected. Therefore, the motor may not be driven directly by using an inappropriate driving value. Thus, the following effect can be achieved: the non-correspondence of the command value and the measured value can be prevented. Therefore, when the frequency analysis is performed based on the command value and the measured value, the frequency analysis can be appropriately executed.

BRIEF DESCRIPTION OF THE DRAWINGS

FIG. 6($a$) to FIG. 6($c$) are diagrams illustrating a relationship of a speed command, a torque command and a frequency response (gain characteristic) after the correction, FIG. 6($a$) is a diagram illustrating a speed command, FIG.

6(b) is a diagram illustrating a torque command, and FIG. 6(c) is a diagram illustrating a frequency response (gain characteristic).

FIG. 9(a) is a diagram illustrating a speed command, FIG. 9(b) is a diagram illustrating a torque command, and FIG. 9(c) is a diagram illustrating a frequency response (gain characteristic).

FIG. 10(a) to FIG. 10(c) are diagrams illustrating a frequency response (gain characteristic) in various embodiments, FIG. 10(a) is a diagram illustrating a frequency response (gain characteristic) before the correction, FIG. 10(b) is a diagram illustrating a frequency response (gain characteristic) after the correction, and FIG. 10(c) is a diagram illustrating a frequency response (gain characteristic) when the correction is performed by setting a reference value.

DESCRIPTION OF THE EMBODIMENTS

Embodiment 1

[Outline of a Control System]

Figure 1:
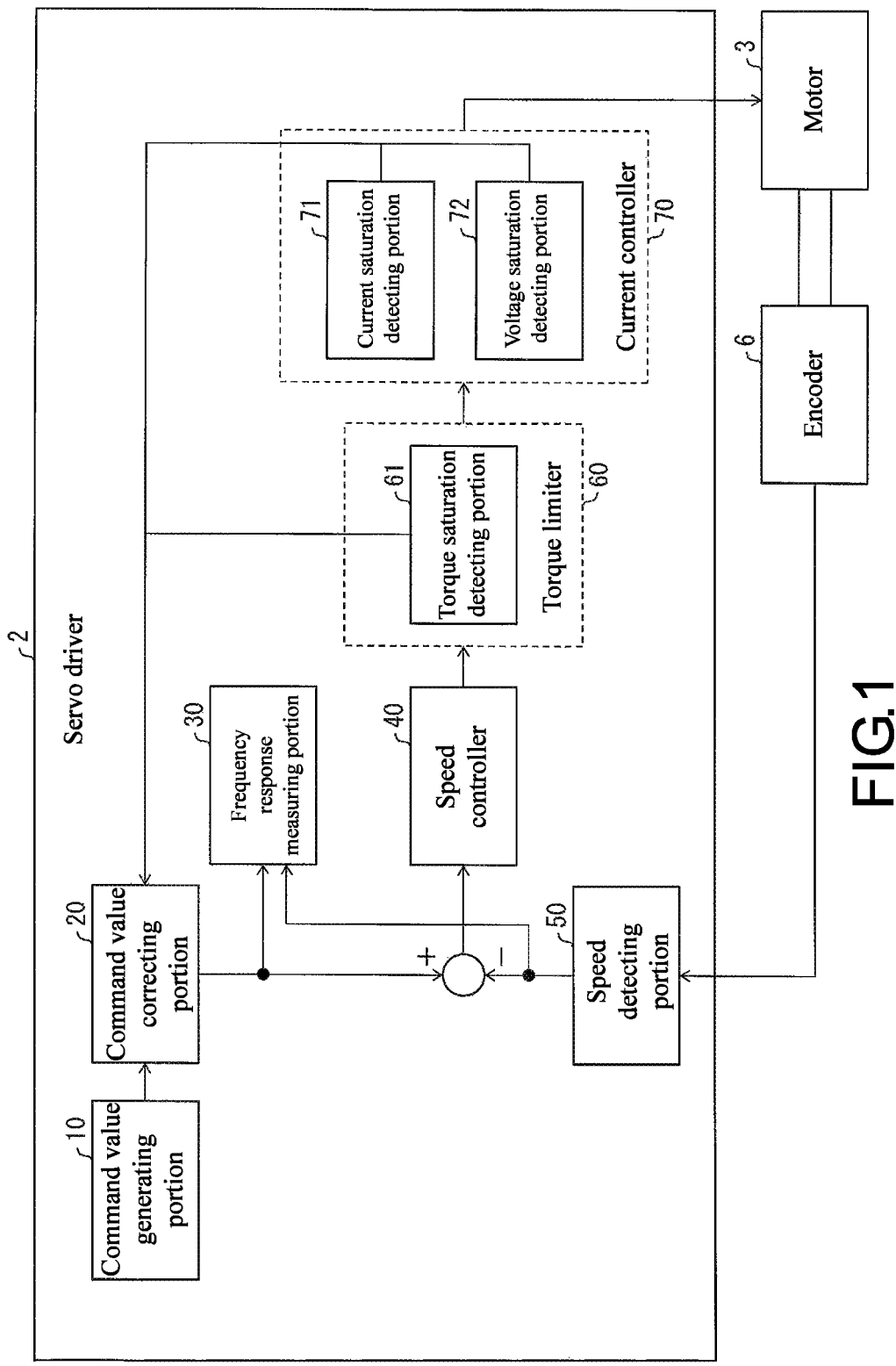
FIG. 1 is a block diagram illustrating the structure of main portions of a servo driver according to the present embodiment.
Figure 2:
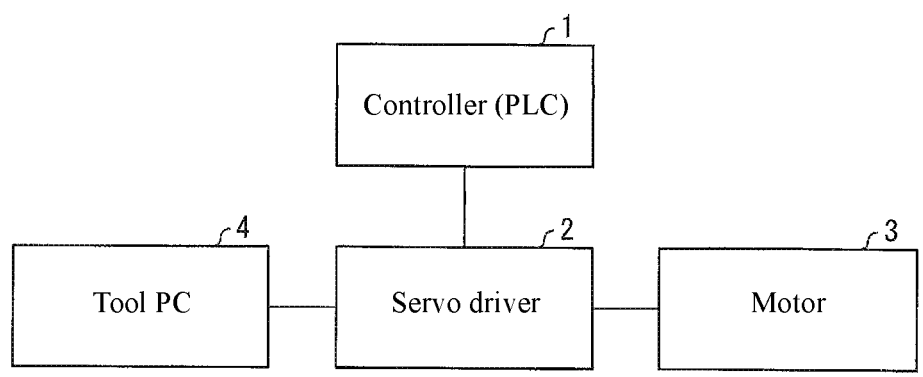
FIG. 2 is a diagram illustrating an outline of a control system according to the present embodiment.

The embodiment of the present invention is described below on the basis of FIG. 1 to FIG. 7. First the control system of the present embodiment is described with reference to FIG. 2. FIG. 2 is a diagram illustrating an outline of a control system according to the present embodiment. The control system uses a servo mechanism to control the action of a load apparatus (an object machine, a controlled object). As shown in FIG. 2, the control system includes a controller (programmable logic controller (PLC)) 1, a servo driver (motor control apparatus) 2, a motor 3 and a tool personal computer (personal computer (PC)) 4.

The controller (PLC) 1 controls the integral system including the servo driver 2.

The servo driver 2 stores a control parameter set and adjusted by the controller 1 or the tool PC 4 and drives the motor 3 according to the control parameter to enable the load apparatus to act.

Moreover, the servo driver 2 measures a frequency response used for setting the control parameter for driving the motor 3 and a filter parameter of an equipped filter.

Moreover, the servo driver 2 is in cabled or wireless communication connection to the controller 1 and the motor 3. For example, the servo driver 2 is connected with the controller 1 by using field networks such as Ethernet for control automation technology (Ether CAT (a registered trademark)), and the servo driver 2 is connected with the motor 3 by using a dedicated cable.

The motor 3 is controlled by the servo driver 2 to drive the load apparatus (object machine)

The tool PC 4 is an apparatus used to set and adjust the control parameter of the servo driver 2 and includes software for adjustment. The tool PC 4 is realized by, for example, the personal computer. By executing a program (the software for adjustment) saved in the personal computer, the computer can be functioned as the tool PC 4.

Moreover, the tool PC 4 is connected with the servo driver 2 by using a universal serial bus (USB) cable and the like.

[Structure of the Servo Driver]

The structure of main portions of the servo driver 2 is described below with reference to FIG. 1. FIG. 1 is a block diagram illustrating the structure of main portions of the servo driver 2. As shown in FIG. 1, the servo driver 2 includes a command generating portion 10, a command value correcting portion (command value correcting portion) 20, a frequency response measuring portion (an analysis apparatus, a frequency characteristic operational portion, an outputting portion) 30, a speed controller 40, a speed detecting portion (a measured value acquiring portion, an outputting portion) 50, a torque limiter 60 and a current controller 70. Moreover, the torque limiter 60 includes a torque saturation detecting portion (an output value determining portion) 61, and the current controller 70 includes a current saturation detecting portion (an output value determining portion) 71 and a voltage saturation detecting portion (an output value determining portion) 72.

Figure 5A:
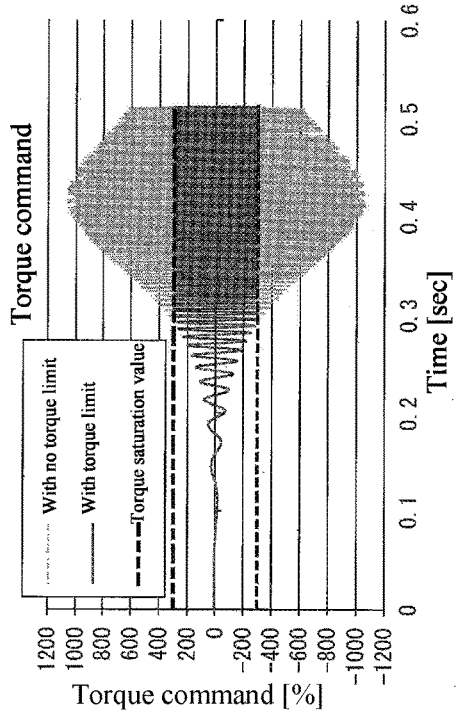
FIG. 5($a$) to FIG. 5($c$) are diagrams illustrating a relationship of a speed command, a torque command and a frequency response (gain characteristic) before the correction, FIG. 5($a$) is a diagram illustrating a speed command, FIG. 5($b$) is a diagram illustrating a torque command, and FIG. 5($c$) is a diagram illustrating a frequency response (gain characteristic).
Figure 5B:
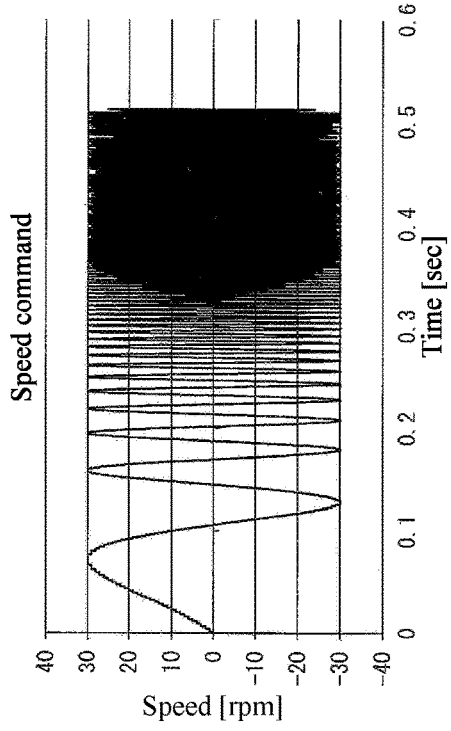
Figure 5C:
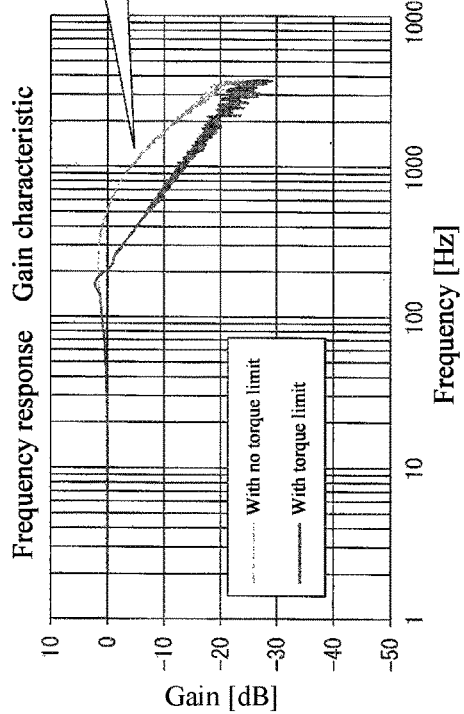

The command value generating portion 10 generates a speed command by using the tool PC 4 according to a command received from a user. More specifically, a command amplitude value of the speed command is set according to a speed amplitude received from the user. FIG. 5(a) to FIG. 5(c) illustrate examples of the speed command value. FIG. 5(a) to FIG. 5(c) are diagrams representing examples of a speed command. In the examples shown in FIG. 5(a) to FIG. 5(c), the speed amplitude is set as "30 rpm". In the present embodiment, the speed command is time sequence data of a scanning sinusoidal wave including a plurality of frequency components. Moreover, as shown in FIG. 5(a) to FIG. 5(c), the speed command is a command with the frequency being gradually increased along a time series. In addition, the command value is not limited to the scanning sinusoidal wave, for example, the command value can also be a random wave (a white signal) including a plurality of frequency components.

Moreover, the command value generating portion 10 notifies the command value correcting portion 20 of the generated speed command. Furthermore, in the case of the command value generated by the tool PC 4, the command value generating portion 10 directly notifies the command value correcting portion 20 of the command value generated by the tool PC 4.

The command value correcting portion 20 corrects the speed command notified by the command value generating portion 10 so as to make a torque value unsaturated when receiving a notice that the torque value is already saturated (torque saturation) from the torque saturation detecting portion 61, i.e., the torque value (driving value) derived from the speed command already exceeds the torque value (threshold value) capable of being output by the servo driver 2.

Moreover, the command value correcting portion 20 corrects the speed command notified by the command value generating portion 10 so as to make a current value unsaturated when receiving a notice that the current is already saturated (current saturation) from the current saturation detecting portion 71, i.e., the current value (driving value) derived from the speed command already exceeds the current value (threshold value) capable of being output by the servo driver 2.

Moreover, the command value correcting portion 20 corrects the speed command notified by the command value generating portion 10 so as to make a voltage value unsaturated when receiving a notice that the voltage is already saturated (voltage saturation) from the voltage saturation detecting portion 72, i.e., the voltage value (driving value) derived from the speed command already exceeds the voltage value (threshold value) capable of being output by the servo driver 2.

Furthermore, when the torque saturation, the current saturation and the voltage saturation are unnecessary to distinguish, the torque saturation, the current saturation and the voltage saturation are also abbreviated as output saturation below. Moreover, the command value correcting portion 20 notifies the frequency response measuring portion 30 and the speed controller 40 of the corrected speed command (corrected command value).

In addition, a method for the command value correcting portion 20 to correct the command value may be the method mentioned below, and may also be a method for lowering the amplitude by multiplying the command value by a coefficient α (0<α<1).

The frequency response measuring portion 30 performs the frequency analysis by using the speed command notified from the command value correcting portion 20 and the detected speed notified from the speed detecting portion 50 (such as Fast Fourier Transform, (FFT)), and derives a frequency response function. Furthermore, the servo driver 2 in the present invention is configured to have a frequency response measuring portion 30 for deriving the frequency response function. However, the servo driver 2 does not necessarily need the frequency response measuring portion 30. That is, the frequency response measuring portion 30 can also be an outputting portion for outputting the speed command notified from the command value correcting portion 20 and the detected speed notified from the speed detecting portion 50 to the analysis apparatus (for example the tool PC 4) for deriving the frequency response function. In this case, the tool PC 4 may have the frequency response measuring portion 30 for deriving the frequency response function. Thus, the frequency response analysis can be realized by using the control system at least having the tool PC 4, the servo driver 2 and the motor 3.

The speed controller 40 calculates the torque value for controlling the motor 3 according to a deviation between the corrected speed command notified from the command value correcting portion 20 and the measured speed notified from the speed detecting portion 50 and notifies the torque limiter 60 of the torque value The speed detecting portion 50 calculates a speed (measured speed, measured value) of the motor 3 according to the location of the motor 3 detected by an encoder 6. Moreover, the speed controller 40 and the frequency response measuring portion 30 are notified of the calculated measuring speed (a driving state). Furthermore, in the case of directly detecting the speed by the encoder 6, the speed detecting portion 50 adopts the speed as the measured speed and informs the speed controller 40 and the frequency response measuring portion 30 of the speed.

The torque limiter 60 determines whether the torque value notified from the speed controller 40 exceeds the torque value capable of being output from the servo driver 2 or not. More specifically, the torque limiter 60 includes a torque saturation detecting portion 61, determines whether the torque value notified from the speed controller 40 exceeds the torque value capable of being output from the servo driver 2 or not and notifies the command value correcting portion 20 of the information representing a determination result when determining as exceeding.

Moreover, the torque limiter 60 notifies the current controller 70 of the torque value notified from the speed controller 40.

The current controller 70 calculates a voltage value based on the current value based on the torque value notified from the torque limiter 60. Further, based on the calculated voltage value, the current controller 70 outputs a signal (for example a pulse-width modulation (PWM) signal) for generating a driving current to an inverter circuit (not shown in the figure) for generating the driving current of the motor 3. The current controller 70 has a function of determining whether the current value or the voltage value capable of being output by the servo driver 2 is exceeded or not. More specifically, the current controller 70 includes a current saturation detecting portion 71, determines whether the current value calculated according to the notified torque value exceeds the current value capable of being output from the servo driver 2 or not and notifies the command value correcting portion 20 of the information representing a determination result when determining as exceeding. Furthermore, the current controller 70 includes a voltage saturation detecting portion 72, determines whether the voltage value calculated according to the current value exceeds the voltage value capable of being output from the servo driver 2 or not and notifies the command value correcting portion 20 of the information representing a determination result when determining as exceeding.

The encoder 6 detects the speed of the motor 3 and notifies the speed detecting portion 50. Furthermore, the encoder 6 can also detect the location (a rotation angle) of the motor 3.

[Correction Processing Flow of the Command Value]

Figure 3:
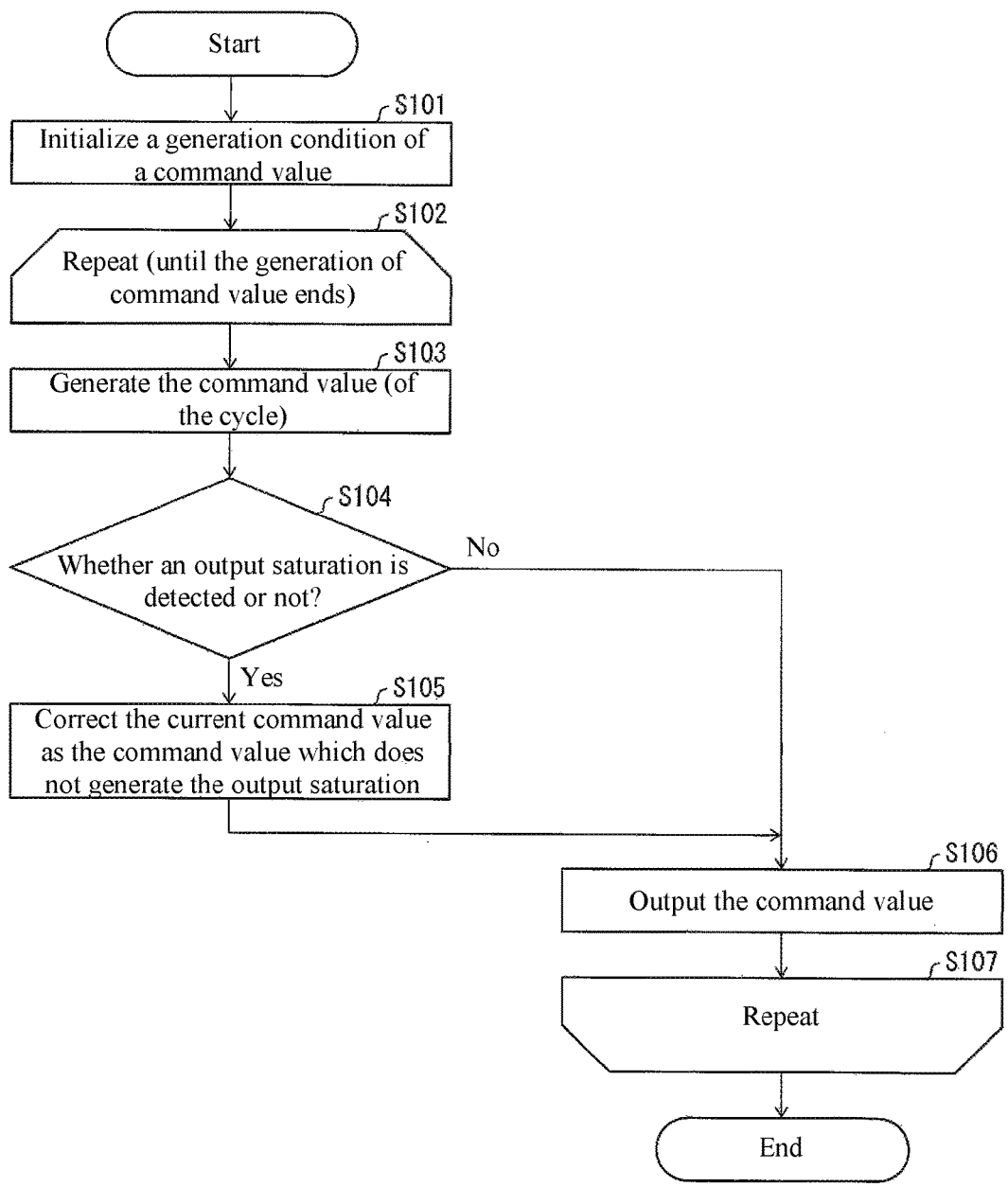
FIG. 3 is a flow chart illustrating a processing flow of a corrected command value in the servo driver.
Figure 4:
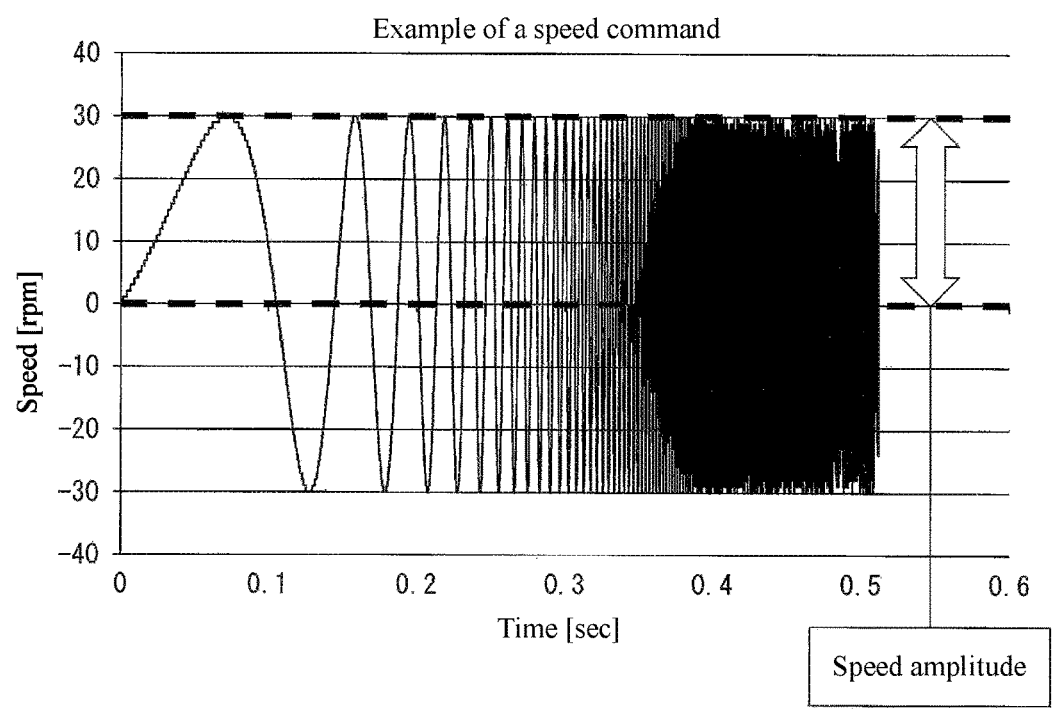
FIG. 4 is a diagram illustrating an example of a speed command generated by a command value generating portion.

The processing flow of generating the command value is described below with reference to FIG. 3. FIG. 3 is a flow chart illustrating a processing flow of generating a command value. As shown in FIG. 3, first the command value generating portion 10 initializes a generation condition of the command value (S101). In this case, the generation condition of the command value may be, for example, an initial amplitude of the command value and a magnification of the amplitude when the scanning sinusoidal wave is used as the command value. Moreover, a value determining a maximum value of the frequency of the command value can be set as the generation condition. The value determining the maximum value of the frequency of the command value may be, for example, a sampling period of the measurement. The generation condition of the command value can be set by using the tool PC 4 connected to the servo driver 2 and can also be set by using a user interface when the servo driver 2 has the user interface for inputting the generation condition. Steps following the initializing step of the generation condition of the command value are repeated at a specified cycle until the command value is generated (S102 and S107). The specified cycle may be, for example, an operational cycle of the servo driver 2. A generation period of the command value may be a period specified by the user, and may also be a preset period.

Then, the command value generating portion 10 generates the command value of the cycle based on the set command value generation condition (S103).

When the generation of the command value is started, the torque saturation detecting portion 61, the current saturation detecting portion 71 and the voltage saturation detecting portion 72 detect whether the torque value, the current value and the voltage value generated by the command value are saturated or not (an output value determining step). More specifically, the torque saturation detecting portion 61 detects the situation that the torque value generated by the command value already exceeds the torque value capable of being output by the servo driver 2 (i.e. detecting the torque saturation), and notifies the command value correcting portion 20 of the situation. Moreover, the current saturation detecting portion 71 detects the situation that the current value generated by the torque value already exceeds the current value capable of being output by the servo driver 2 (i.e. detecting the current saturation), and notifies the command value correcting portion 20 of the situation. Moreover, the voltage saturation detecting portion 72 detects the situation that the voltage value generated by the current value already exceeds the voltage value capable of being output by the servo driver 2 (i.e. detecting the voltage saturation), and notifies the command value correcting portion 20 of the situation.

The command value correcting portion 20 corrects the command value generated by the command value generating portion 10 when the torque saturation detecting portion 61 detects the torque saturation (YES in S104), when the current saturation detecting portion 71 detects the current saturation (YES in S104), or when the voltage saturation detecting portion 72 detects the voltage saturation (YES in S104) (S105, the command value correcting step). A detailed correcting method will be described hereinafter. Then, the corrected command value is notified to the speed controller 40, and a control value based on the command value is output to the motor 3 (S106).

Moreover, the command value correcting portion 20 directly notifies the peed controller 40 of the command value generated by the command value generating portion 10 and outputs the control value based on the command value to the motor 3 when the torque saturation detecting portion 61 does not detect the torque saturation (NO in S104), when the current saturation detecting portion 71 does not detect the current saturation (NO in S104), or when the voltage saturation detecting portion 72 does not detect the voltage saturation (NO in S104) (S106).

Moreover, a measuring result of the motor 3 driven based on the control value is acquired (a measured value acquiring step), and the command value and the measuring result are notified to the frequency response measuring portion 30 (an outputting step). Furthermore, when the frequency response measuring portion 30 for deriving the frequency response function is arranged in the tool PC 4 rather than in the servo driver 2, and when the outputting portion is arranged in the servo driver 2, the outputting portion outputs the command value and the measuring result to the tool PC 4 in the outputting step. Furthermore, the outputting portion can also store the command value and the measuring result in a storage apparatus (not shown) for a specified period.

[Details of the Correction Processing]

The correcting method of the command value correcting portion 20 will be described below. The correcting method is described as above, and a method for lowering the amplitude by multiplying the command value by the coefficient α (0<α<1) may be used. Moreover, a method for lowering the amplitude by using the low pass filter adopting the frequency of the command value at the cycle in which the output saturation is generated as the cut-off frequency may be used. The correcting method is described.

The command value correcting portion 20 adopts the output, which is obtained when the command value from the command value generating portion 10 is inputted to a primary low pass filter adopting the frequency of the command value notified from the command value generating portion 10 at the moment as the cut-off frequency, as the corrected command value when receiving a notice of the output saturation from the torque saturation detecting portion 61, the current saturation detecting portion 71 or the voltage saturation detecting portion 72.

That is, the command value correcting portion 20 may be referred to as a command correcting device for transferring the function of the primary low pass filter (after-mentioned equation (1)) adopting the frequency of the command value at the moment of the output saturation as the cut-off frequency, the command value from the command value generating portion 10 is inputted to the command value correcting portion 20, and the output command value may be referred to as the corrected command value.

$$G_1 = (2 \times \pi \times f_{current})/(s + 2 \times \pi \times f_{current}) \quad (1)$$

wherein, $f_{current}$ is the frequency of the command value reaching the output saturation and output from the command value generating portion 10, and s is a plus operator.

Comparative Examples of the Invention

Referring to FIG. 5(*a*) to FIG. 5(*c*), the relationship of the speed command, torque command and frequency response (gain characteristic) before the correction as a comparative example of the present invention will be described below. FIG. 5(*a*) to FIG. 5(*c*) are diagrams illustrating a relationship of a speed command, a torque command and a frequency response (gain characteristic) before the correction, FIG. 5(*a*) is a diagram illustrating a speed command, FIG. 5(*b*) is a diagram illustrating a torque command, and FIG. 5(*c*) is a diagram illustrating a frequency response (gain characteristic).

In the case of the speed command shown in FIG. 5(*a*), the corresponding torque command is as shown in FIG. 5(*b*). If the torque value is not limited, the torque value as shown by "no torque limit" in FIG. 5(*b*) becomes a value having the torque command exceeding ±1000% and corresponding to the speed command. In another aspect, in the case of limited torque value (in the case of torque saturation), the torque value as shown in "torque limit" of FIG. 5(*b*) corresponds to the speed command before the torque limited value, and becomes a value inhibited as the torque limited value if the torque value corresponds to the speed command and exceeds the torque limit.

Moreover, for the frequency response (gain characteristic), it can be known from FIG. 5 (*c*) that in the case of applying the torque limit, compared with the situation of no torque limit, the accuracy of the frequency response higher than 200 Hz is worser. That is, if the frequency response result is solved according to the relationship of the speed command and a driving result of the motor 3 driven by using the torque command with no torque limit corresponding to the speed command, since the motor 3 is driven based on the torque command corresponding to the speed command, a waveform of the frequency response accurately reflecting the characteristic of the controlled object can be calculated. In another aspect, if the frequency response result is solved according to the relationship of the speed command and a driving result of the motor 3 driven by using the torque command with torque limit and not corresponding to the speed command, since the motor 3 is driven based on the torque command not corresponding to the speed command, the frequency response characteristic of the controlled object cannot be accurately acquired. In the past, when the command value is not corrected, the torque command generated by the command value always exceeds an upper limit value of the torque limiter, so the frequency response is measured at the state of the torque limit. Therefore, the frequency response characteristic of the controlled object cannot be accurately acquired. The present invention provides the method, the control system and the motor control apparatus capable of accurately calculating the frequency response characteristic even at the state of the torque limit, i.e. in the case of calculating the frequency response by using the servo driver configured to limit the command value when the output saturation is detected.

Embodiment 2

A further embodiment of the present invention is described based on FIG. 6(a) to 6(c) and FIG. 7. In addition, in convenience of description, components having same functions as those described in the embodiments are marked with the same reference numerals, while the description of the components is omitted. The present embodiment differs from embodiment 1 in that when the output saturation is detected at one cycle, the command value correcting portion 20 corrects the command value notified from the command value generating portion 10. Here, the one cycle refers to a generation cycle of the command value.

Correction Example

Referring to FIG. 6(a) to FIG. 6(c), the relationship of the speed command, the torque command and the frequency response (gain characteristic) after the correction in the present embodiment will be described. FIG. 6(a) to FIG. 6(c) are diagrams illustrating a relationship of a speed command, a torque command and a frequency response (gain characteristic) after the correction, FIG. 6(a) is a diagram illustrating a speed command, FIG. 6(b) is a diagram illustrating a torque command, and FIG. 6(c) is a diagram illustrating a frequency response (gain characteristic).

The speed command shown in FIG. 6(a) represents a state for correcting the speed command shown in FIG. 5(a) and lowering the amplitude of the speed command. The torque command corresponding to the speed command becomes "command correction" shown in FIG. 6(b). As shown by "command correction" in FIG. 6(b), in the case of correction, after the torque command is approximate to the torque limit value, the torque command is away from the torque limit value (close to zero). In addition, in FIG. 6(b), the torque command of no torque limit is also illustrated so as to perform the comparison.

Moreover, for the frequency response (gain characteristic), it can be known from FIG. 6 (c) that in the case of command correction, compared with the torque limit, the accuracy is higher.

[Correction Processing Flow of the Command Value in the Present Embodiment]

Figure 7:
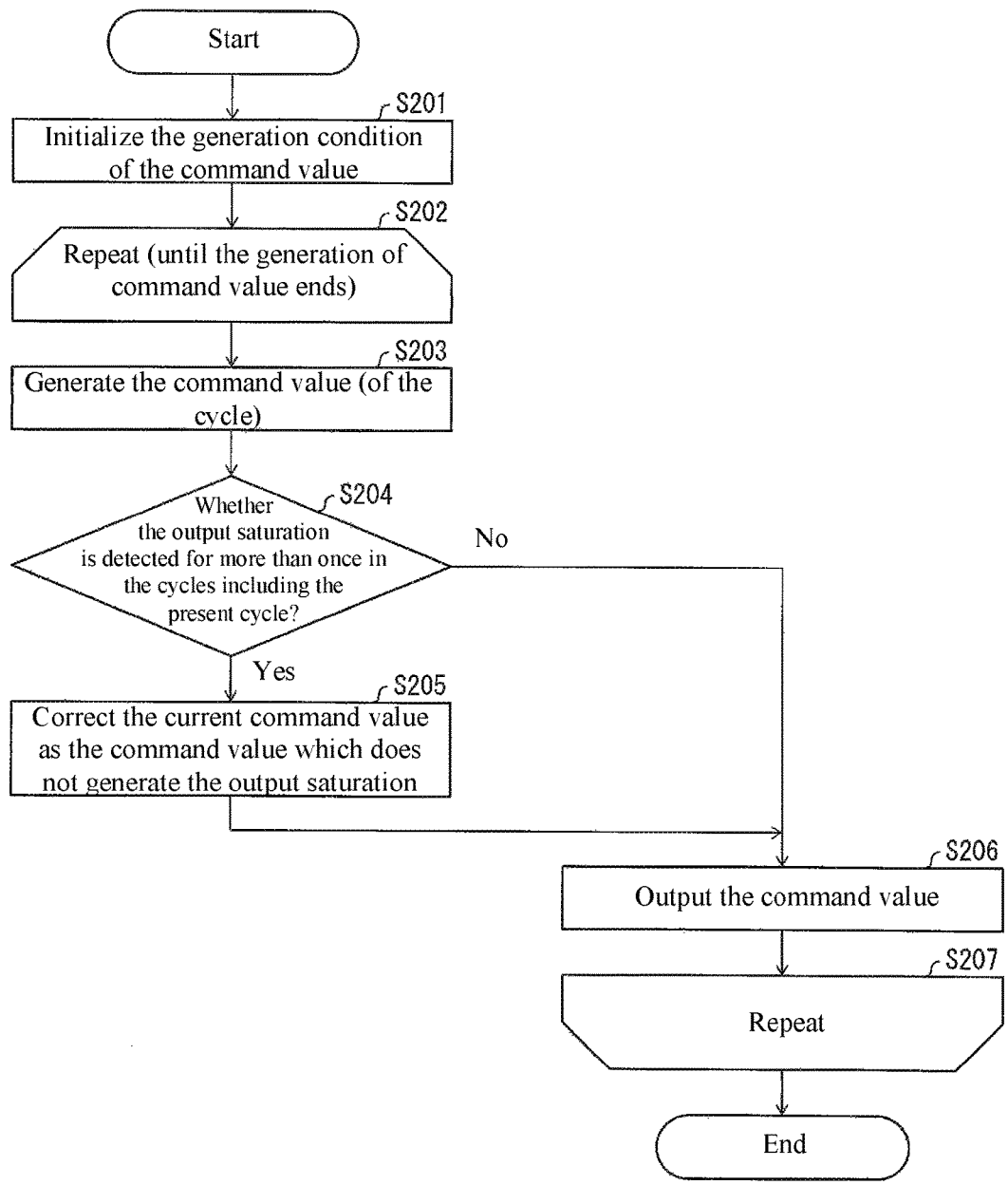
FIG. 7 is a flow chart illustrating a correction processing flow of a command value according to another embodiment.

The correction processing flow of the command value in the present embodiment is described with reference to FIG. 7. FIG. 7 is a flow chart illustrating a correction processing flow of a command value according to the present embodiment.

As shown in FIG. 7, first the command value generating portion 10 initializes the generation condition of the command value (S201). In this case, the generation condition of the command value may be, for example, the initial amplitude of the command value and the magnification of the amplitude when the scanning sinusoidal wave is used as the command value. Moreover, the value determining the maximum value of the frequency of the command value can be set as the generation condition. The value determining the maximum value of the frequency of the command value may be, for example, the sampling period of the measurement. The generation condition of the command value can be set by using the tool PC 4 connected to the servo driver 2 and can also be set by using a user interface when the servo driver 2 has the user interface for inputting the generation condition. Steps following the initializing step of the generation condition of the command value are repeated at the specified cycle until the command value is generated (S202 and S207). The specified cycle may be, for example, the operational cycle of the servo driver 2. As in embodiment 1, the generation period of the command value may be the period specified by the user, and may also be the preset period.

Then, the command value generating portion 10 generates the command value of the cycle based on the set command value generation condition (S203)

When the generation of the command value is started, the torque saturation detecting portion 61, the current saturation detecting portion 71 and the voltage saturation detecting portion 72 detect whether the torque value, the current value and the voltage value generated by the command value are saturated or not. More specifically, the torque saturation detecting portion 61 detects the torque saturation, and notifies the command value correcting portion 20 of the torque saturation. Moreover, the current saturation detecting portion 71 detects the current saturation, and notifies the command value correcting portion 20 of the current saturation. Moreover, the voltage saturation detecting portion 72 detects the voltage saturation, and notifies the command value correcting portion 20 of the voltage saturation.

The command value correcting portion 20 corrects the command value generated by the command value generating portion 10 at the current cycle when the torque saturation detecting portion 61 detects the torque saturation (YES in S204), when the current saturation detecting portion 71 detects the current saturation (YES in S204), or when the voltage saturation detecting portion 72 detects the voltage saturation (YES in S204) (S205). Then, the corrected command value is notified to the speed controller 40, and the control value based on the command value is output to the motor 3 (S206).

Moreover, the command value correcting portion 20 directly notifies the speed controller 40 of the command value generated by the command value generating portion 10 and outputs the control value based on the command value to the motor 3 at the current cycle when the torque saturation detecting portion 61 does not detect the torque saturation (NO in S204), when the current saturation detecting portion 71 does not detect the current saturation (NO in S204), or when the voltage saturation detecting portion 72 does not detect the voltage saturation (NO in S204) (S206).

The method for correcting the command value generated by the command value generating portion 10 is then described in the step S205. The method recorded in the embodiment (details of correction processing) can be used as the method for correcting the command value. Moreover, a variant of the method for lowering the amplitude by multiplying the command value by the coefficient $\alpha$ can be used. That is, the command value correcting portion 20 utilizes a number $\beta$ of cycles counted from the cycle in which the output saturation is detected to the current cycle and performs the multiplication of a value of coefficient $\alpha^\beta$ by the command value to correct the command value. By executing the correction processing, the amplitude is decreased along a time series when the scanning sinusoidal wave is used as the command value.

In addition, as long as it is the method for decreasing the command value, the method for correcting the command value is not particularly limited to the method for multiplying the coefficient $\alpha^\beta$ by the command value. Moreover, as in after-mentioned embodiment 3, in the structure not allowing the amplitude of the command value to be smaller than the specified reference value, only a cycle in which the amplitude of the command value is decreased is needed.

As mentioned above, the present embodiment differs from embodiment 1 in the processing in the step S204. In embodiment 1, when the output saturation is detected, and more specifically in each cycle in which the output saturation is detected, the command value is corrected; however, the command value generated after the cycle in which the output saturation is detected is corrected. Since the case that the amplitude of the speed command value is gradually increased is more, once the output saturation is achieved, the possibility of achieving the output saturation is high henceforth. In the present embodiment, once the output saturation is achieved, the command value is corrected henceforth, so that the output saturation can be appropriately avoided.

Embodiment 3

A further embodiment of the present invention is described based on FIG. 8-FIG. 10(a) to FIG. 10(c). In addition, in convenience of description, components having same functions as those described in the embodiments are marked with the same reference numerals, while the description of the components is omitted.

The present embodiment differs from embodiment 1 and embodiment 2 in that after the output saturation is detected and the command value is corrected, the command value is output when the corrected command value is greater than or equal to the predetermined reference value (specified value). In the corrected command value, the input of a high-frequency part is reduced, the output is correspondingly reduced too; however, in a high-frequency zone, a noise component is increased, so the output value may become an inappropriate value sometimes. In this case, the measuring result of the frequency response is inappropriate, and the accuracy of the frequency characteristic is worser. In the present embodiment, by predetermining the reference value for the corrected command value to limit the corrected command value, the influence of the noise on the output value can be alleviated, and the measuring accuracy of the high-frequency zone of the frequency response can be improved.

[Processing Flow in the Present Embodiment]

Figure 8:
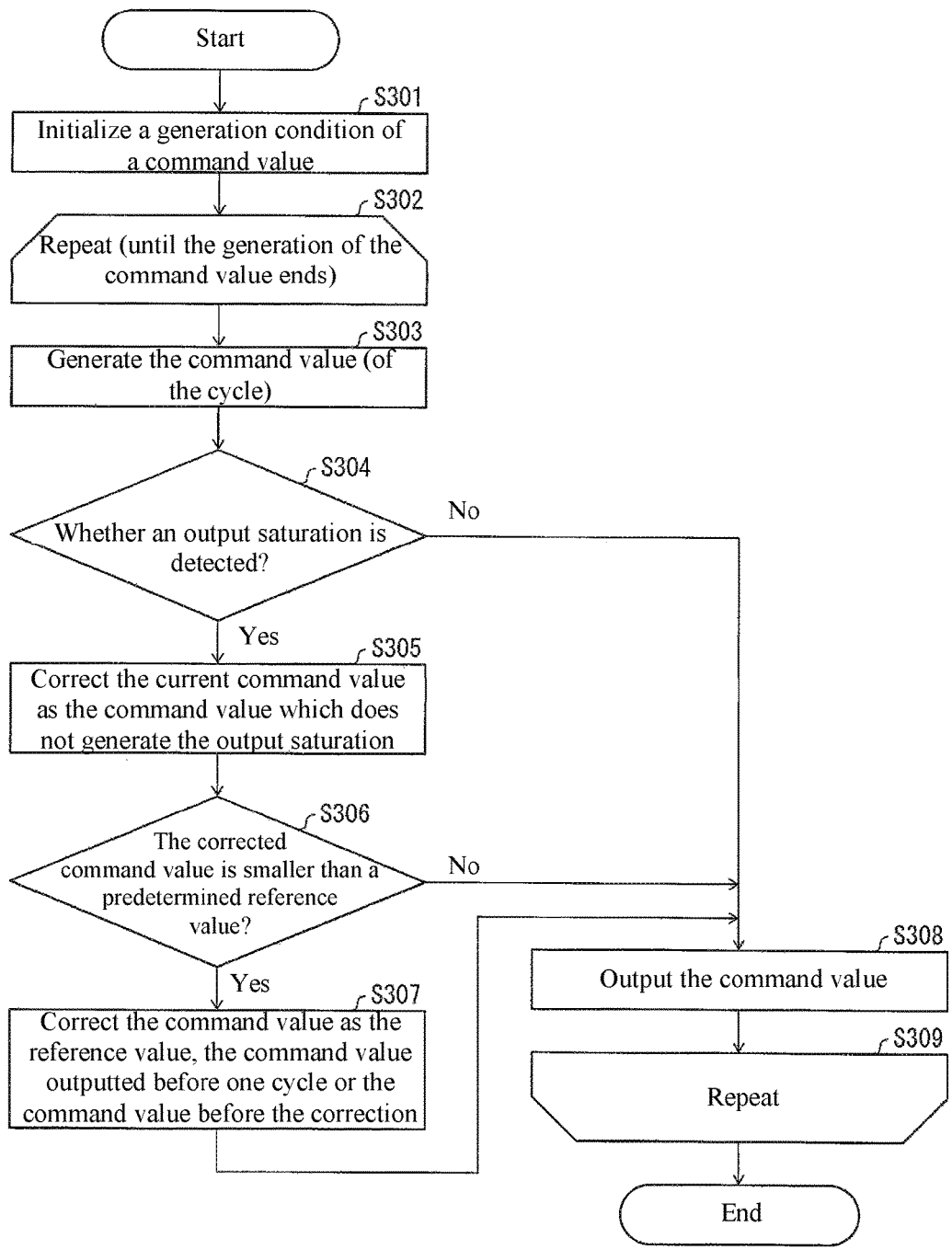
FIG. 8 is a flow chart illustrating a correction processing flow of a command value according to a further another embodiment.

The correction processing flow of the command value in the present embodiment is described with reference to FIG. 8. FIG. 8 is a flow chart illustrating a correction processing flow of a command value according to the present embodiment. As shown in FIG. 8, first the command value generating portion 10 initializes the generation condition of the command value (S301). In this case, the generation condition of the command value may be, for example, the initial amplitude of the command value and the magnification of the amplitude when the scanning sinusoidal wave is used as the command value. Moreover, the value determining the maximum value of the frequency of the command value can be set as the generation condition. The value determining the maximum value of the frequency of the command value may be, for example, the sampling period of the measurement. The generation condition of the command value can be set by using the tool PC 4 connected to the servo driver 2 and can also be set by using a user interface when the servo driver 2 has the user interface for inputting the generation condition. Steps following the initializing step of the generation condition of the command value are repeated at the specified cycle until the command value is generated (S302 and S309). The specified cycle may be, for example, the operational cycle of the servo driver 2. As in embodiment 1 and embodiment 2, the generation period of the command value may be the period specified by the user, and may also be the preset period.

Then, the command value generating portion 10 generates the command value of the cycle based on the set command value generation condition (S303).

When the generation of the command value is started, the torque saturation detecting portion 61, the current saturation detecting portion 71 and the voltage saturation detecting portion 72 detect whether the torque value, the current value and the voltage value generated by the command value are saturated or not. More specifically, the torque saturation detecting portion 61 detects the torque saturation, and notifies the command value correcting portion 20 of the torque saturation. Moreover, the current saturation detecting portion 71 detects the current saturation, and notifies the command value correcting portion 20 of the current saturation. Moreover, the voltage saturation detecting portion 72 detects the voltage saturation, and notifies the command value correcting portion 20 of the voltage saturation.

The command value correcting portion 20 corrects the command value generated by the command value generating portion 10 when the torque saturation detecting portion 61 detects the torque saturation (YES in S304), when the current saturation detecting portion 71 detects the current saturation (YES in S304), or when the voltage saturation detecting portion 72 detects the voltage saturation (YES in S304) (S305).

Then, the command value correcting portion 20 determines whether the corrected command value is smaller than a preset reference value (S306), if the corrected command value is greater than or equal to the reference value (No in S306), the corrected command value is notified to the speed controller 40, and the control value based on the command value is output to the motor 3 (S308). In another aspect, if the corrected command value is smaller than the reference value (YES in S306), the command value is set as the reference value, the command value output before one cycle or the command value before the correction and is notified to the speed controller 40, and the control value based on the command value is output to the motor 3 (S308). Furthermore, a most preferred structure is to set the command value as the reference value and to notify the speed controller 40 of the command value. That is because if the command value is set as the command value output before one cycle or the command value before the correction, the possibility of generating the output saturation is higher.

Moreover, the command value correcting portion 20 directly notifies the speed controller 40 of the command value generated by the command value generating portion 10 and outputs the control value based on the command value to the motor 3 at the current cycle when the torque saturation detecting portion 61 does not detect the torque saturation (NO in S304), when the current saturation detecting portion 71 does not detect the current saturation (NO in S304), or when the voltage saturation detecting portion 72 does not detect the voltage saturation (NO in S304) (S308).

As mentioned above, in the present embodiment, even in the case of detecting the output saturation and correcting the command value in the step S304, when the corrected command value is smaller than the reference value, the corrected command value is still not used but the reference value or the command value before the correction is used. Thus, the influence of the noise on the output value is alleviated, and the measuring accuracy of the high-frequency zone of the frequency response can be improved.

Correction Examples

Figure 9A:
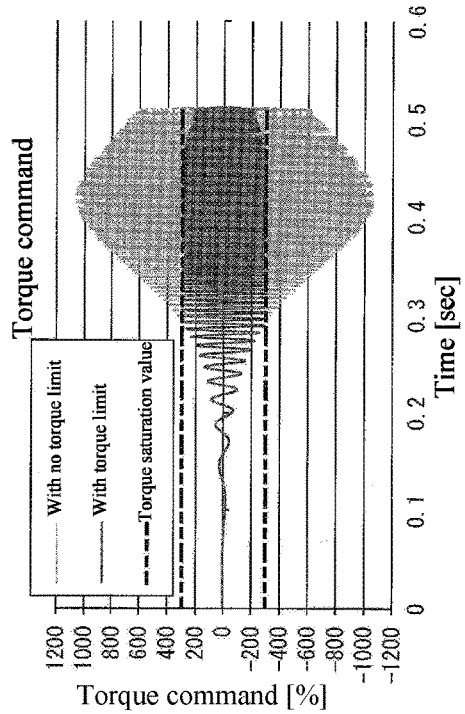
FIG. 9(a) to FIG. 9(c) are diagrams illustrating a relationship of a speed command, a torque command and a frequency response (gain characteristic) after the correction.
Figure 9B:
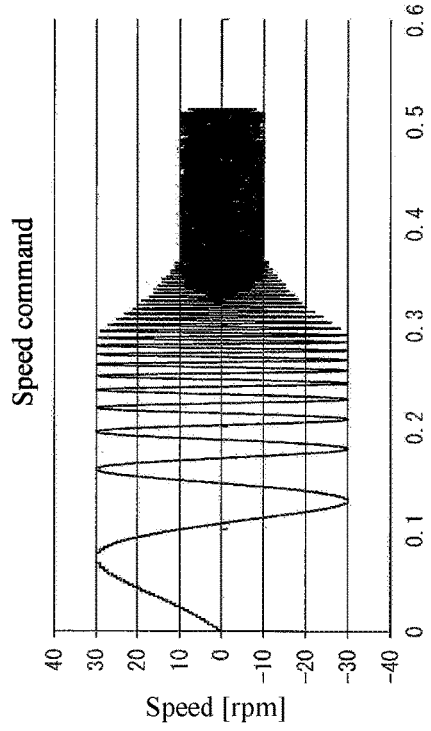
Figure 9C:
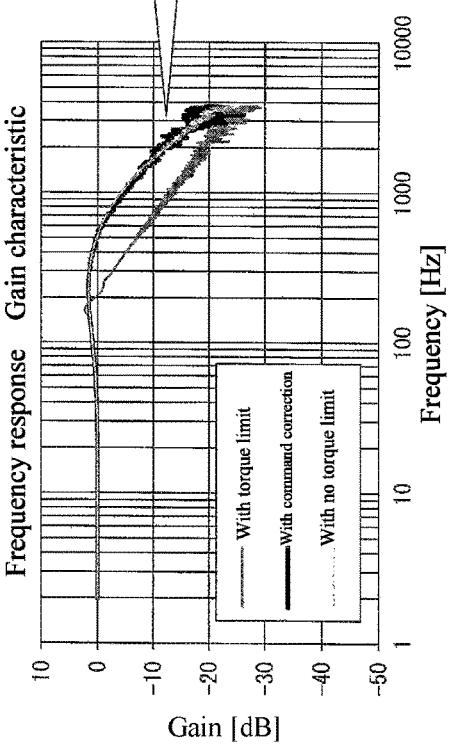

Then, referring to FIG. 9(a) to FIG. 9(c), the relationship of the speed command, the torque command and the frequency response (gain characteristic) when the correction not allowing the amplitude of the command value to be smaller than the predetermined reference value before the correction is performed will be described. FIG. 9(a) to FIG. 9(c) are diagrams illustrating a relationship of a speed command, a torque command and a frequency response (gain characteristic) after the correction, FIG. 9(a) is a diagram illustrating a speed command, FIG. 9(b) is a diagram illustrating a torque command, and FIG. 9(c) is a diagram illustrating a frequency response (gain characteristic).

The speed command shown in FIG. 9(a) represents a state at which the speed command shown in FIG. 5(a) is corrected, the amplitude of the speed command is lowered and the correction is not performed when the speed command is smaller than the reference value (or consistent with the reference value). It can be known from the example shown in FIG. 9(a) that the state smaller than the reference value is generated between 0.3 s and 0.4 s, and the speed command is consistent with the reference value. The torque command corresponding to the speed command becomes "command correction" shown in FIG. 9(b). As shown with "command correction" in FIG. 9(b), in the case of correction, after the torque command is approximate to the torque limit value, the torque command is stable when the torque command is close to the torque limit value. In addition, in FIG. 9(b), the torque command with no torque limit is also illustrated so as to perform the comparison.

Moreover, for the frequency response (gain characteristic), it can be known from FIG. 9 (c) that in the case of command correction, compared with the torque limit, the accuracy is higher.

Summary of Correction Examples

Referring to FIG. 10(a) to FIG. 10(c), the frequency response (gain characteristic) in the embodiment is comparatively described below. FIG. 10(a) to FIG. 10(c) are diagrams illustrating a frequency response (gain characteristic) in various embodiments, FIG. 10(a) is a diagram illustrating a frequency response (gain characteristic) before the correction, FIG. 10(b) is a diagram illustrating a frequency response (gain characteristic) after the correction, and FIG. 10(c) is a diagram illustrating a frequency response (gain characteristic) when the correction is performed by setting a reference value.

As shown in FIG. 10(a), it can be known that when the correction is not performed, the accuracy of the high-frequency part of the frequency response (gain characteristic) due to the application of the torque limit is worser. Moreover, as shown in FIG. 10(b), it can be known that when the correction is performed before the reference value is set, the measuring accuracy of the frequency response is improved by performing the correction. However, in the high-frequency zone, the SN ratio is worsened, so the measuring accuracy of the frequency response of the high-frequency part is also worsened. Moreover, as shown in FIG. 10(c), it can be known that when the correction is performed after the reference value is set, compared with the situation of not setting the reference value, the measuring accuracy of the frequency response is improved. That is because, the worsening of the SN ratio of the high-frequency zone is inhibited by setting the reference value.

Embodiment 4

Figure 11:
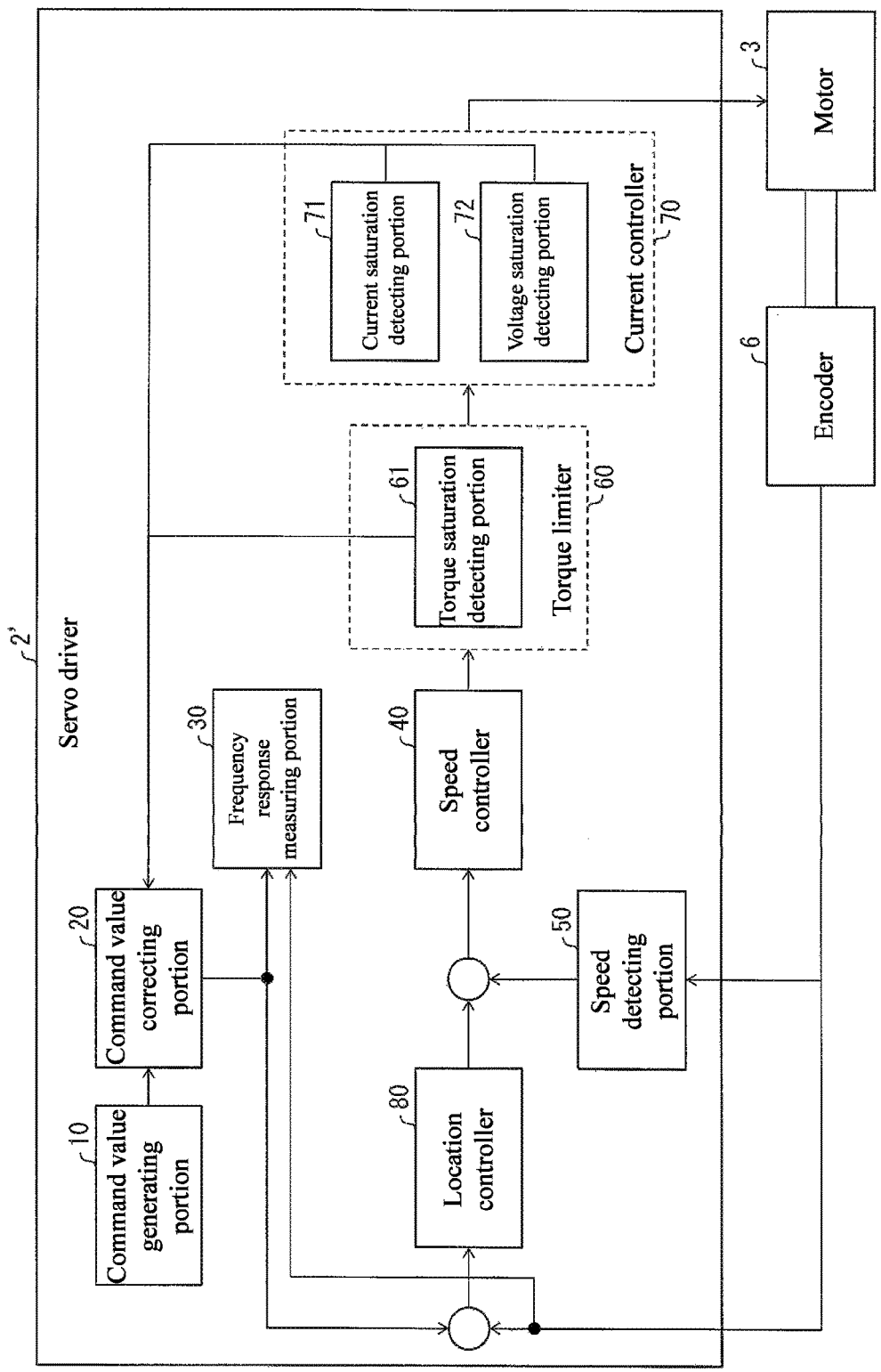
FIG. 11 is a block diagram illustrating main portions of a servo driver according to a further another embodiment.

A further embodiment of the present invention is described below based on FIG. 11. In addition, in convenience of description, components having same functions as those described in the embodiments are marked with the same reference numerals, while the description of the components is omitted.
[Structure of the Servo Driver]

The servo driver 2' of the present embodiment is described with reference to FIG. 11. FIG. 11 is a block diagram illustrating the structure of main portions of the servo driver 2' according to the present embodiment.

According to the present embodiment, a location controller 80 is additionally arranged in the structure of the servo driver 2 of the embodiments. In the present embodiment, the command value generating portion 10 generates a location command as a command value, and the command value correcting portion 20 corrects the location command generated by the command value generating portion 10. Moreover, the corrected location command is notified to the location controller 80.

The location controller 80 utilizes a deviation between the location command notified from the command value correcting portion 20 and a measured location notified from the encoder 6 to generate the speed command and notify the speed controller 40 of the speed command.

Hence, even in the case of utilizing the location command as the command value, the command value can also be corrected as that in embodiment 1 to embodiment 3, so that the frequency response can be appropriately measured.
[Details of the Correction Processing]

The correcting method of the command value correcting portion 20 in the present embodiment will be described.

The command value correcting portion 20 adopts the output, which is obtained when the command value from the command value generating portion 10 is inputted to a primary low pass filter adopting the frequency of the command value notified from the command value generating portion 10 at the moment as the cut-off frequency, as the corrected command value when receiving the notice of the output saturation from the torque saturation detecting portion 61, the current saturation detecting portion 71 or the voltage saturation detecting portion 72.

That is, the command value correcting portion 20 may be referred to as a command correcting device for transferring the function of the primary low pass filter (after-mentioned equation (2)) adopting the frequency of the command value at the moment of the output saturation as the cut-off frequency, the command value from the command value generating portion 10 is inputted to the command value correcting portion 20, and the output command value can be the corrected command value.

$$G_2 = (2 \times \pi \times f_{current})/(s + 2 \times \pi \times f_{current}) \qquad (2)$$

wherein, $f_{current}$ is the frequency of the command value reaching the output saturation and output from the command value generating portion 10, and s is a plus variable operator.

[Implementation Examples by Using Software]

The servo driver 2 and control modules of the servo driver 2' (especially the command value generating portion 10, the command value correcting portion 20, the frequency response measuring portion 30, the speed controller 40, the speed detecting portion 50, the torque limiter 60 (the torque saturation detecting portion 61), the current controller 70 (the current saturation detecting portion 71, the voltage saturation detecting portion 72) and the location controller 80) can be implemented through a logic circuit (hardware) formed on an integrated circuit (an IC chip), and can also be implemented by using a central processing unit (CPU) through software.

In the latter case, the servo driver 2 and the servo driver 2' are provided with a CPU for executing commands of various functions of software (i.e. programs), a computer-readable read only memory (ROM) or storage apparatus (referred to as "recording medium") which record all programs and various data, and a random access memory (RAM) for expanding the programs. Moreover, the computer (or CPU) is used for reading the program from the recording medium and executing the program, thereby achieving the objective of the present invention. "A non-temporary physical medium" can be used as the recording medium, for example, tapes, disks, cards, semiconductor memories, programmable logic circuits and the like can be used. Moreover, the programs can also be provided to the computer via any transmission medium (a communication network or broadcast waves). Furthermore, the present invention can also be realized in a form of data signals for instantiating the programs and embedded in a carrier.

The present invention is not limited to the embodiments described above, and various modifications may be made within the scope of the claims. Embodiments obtained by appropriately combining the technical components separately disclosed in different embodiments are also included in the technical scope of the present invention. Furthermore, the technical components separately disclosed in various embodiments can be combined to form a new technical feature.

What is claimed is:

1. A motor control apparatus, for controlling a motor, the motor control apparatus comprising:
   a command value generating portion, generating a command value for driving the motor;
   an output value determining portion, determining whether a driving value for driving the motor generated based on the command value exceeds a driving value capable of being output from the motor control apparatus;
   a command value correcting portion, correcting the command value when the output value determining portion determines as exceeding the driving value capable of being output;
   a measured value acquiring portion, acquiring a measured value representing a driving state of the motor driven according to the command value or the corrected command value; and
   an outputting portion, outputting the corrected command value and the measured value based on the corrected command value to an analysis apparatus for performing a frequency analysis based on a relationship of the command value and the measured value when the output value determining portion determines as exceeding the driving value capable of being output, wherein
   the command value correcting portion adopts an output of a low pass filter as the corrected command value when the command value is input to the low pass filter adopting a frequency of the command value at the moment when the output value determining portion determines as exceeding the driving value capable of being output, as a cut-off frequency.

2. The motor control apparatus according to claim 1, wherein
   the output value determining portion performs the determination based on whether a torque value based on the command value, a current value based on the torque value or a voltage value based on the current value exceeds a threshold value or not.

3. The motor control apparatus according to claim 1, wherein
   the command value correcting portion corrects the command value by lowering an amplitude of the command value.

4. The motor control apparatus according to claim 3, wherein
   the command value correcting portion corrects the command value in a way of gradually decreasing the amplitude of the command value along a time series.

5. The motor control apparatus according to claim 3, wherein
   the command value correcting portion does not correct the command value when the amplitude of the corrected command value is equal to or less than a specified value.

6. The motor control apparatus according claim 1, wherein
   the command value is a location command for indicating a location of the motor or a speed command for indicating a speed of the motor.

7. The motor control apparatus according claim 1, wherein
   when the output value determining portion determines as exceeding the driving value capable of being output, the command value correcting portion continuously corrects the command value generated by the command value generating portion.

8. A control system for outputting a frequency characteristic of a controlled object including a motor, the control system comprising
   a command value generating portion, generating a command value for driving the motor;
   an output value determining portion, determining whether a driving value for driving the motor generated based on the command value exceeds a driving value capable of being output from an apparatus;
   a command value correcting portion, correcting the command value when the output value determining portion determines as exceeding the driving value capable of being output;
   a measured value acquiring portion, acquiring a measured value representing a driving state of the motor driven according to the command value or the corrected command value; and
   a frequency characteristic calculation portion, calculating and outputting the frequency characteristic based on the corrected command value and the measured value based on the corrected command value when the output value determining portion determining as exceeding the driving value capable of being output, wherein
   the command value correcting portion adopts an output of a low pass filter as the corrected command value when the command value is input to the low pass filter adopting a frequency of the command value at the moment when the output value determining portion determines as exceeding the driving value capable of being output, as a cut-off frequency.

9. A method for controlling a motor, comprising:

a command value generating step, generating a command value for driving the motor;

an output value determining step, determining whether a driving value for driving the motor generated based on the command value exceeds a driving value capable of being output from an apparatus;

a command value correcting step, correcting the command value when determining as exceeding the driving value capable of being output in the output value determining step;

a measured value acquiring step, acquiring a measured value representing a driving state of the motor driven based on the command value or the corrected command value; and an outputting step, outputting the corrected command value and the measured value based on the corrected command value to an analysis apparatus for performing a frequency analysis based on a relationship of the command value and the measured value when determining as exceeding the driving value capable of being output in the output value determining step, wherein an output of a low pass filter is adopted as the corrected command value when the command value is input to the low pass filter adopting a frequency of the command value at the moment when determining as exceeding the driving value capable of being output, as a cut-off frequency.

10. An information processing program for allowing a computer to function as the motor control apparatus according to claim 1, characterized by allowing the computer to function as each of the portions.

11. A non-transitory computer-readable recording medium, recording the information processing program according to claim 10.

* * * * *